United States Patent
Seo et al.

(10) Patent No.: US 11,613,677 B2
(45) Date of Patent: Mar. 28, 2023

(54) WATER-BASED ACRYLIC PRESSURE-SENSITIVE ADHESIVE FOR CLOTHING, AND PREPARATION METHOD THEREOF

(71) Applicant: LG Chem, Ltd., Seoul (KR)

(72) Inventors: Sungjong Seo, Daejeon (KR); Jung Sup Han, Daejeon (KR); Hyunju Cho, Daejeon (KR); Kumhyoung Lee, Daejeon (KR); Keu Yeun Park, Daejeon (KR); Jungeun Yeo, Daejeon (KR)

(73) Assignee: LG Chem, Ltd.

( * ) Notice: Subject to any disclaimer, the term of this patent is extended or adjusted under 35 U.S.C. 154(b) by 85 days.

(21) Appl. No.: 16/642,482

(22) PCT Filed: Dec. 7, 2018

(86) PCT No.: PCT/KR2018/015465
§ 371 (c)(1),
(2) Date: Feb. 27, 2020

(87) PCT Pub. No.: WO2019/117539
PCT Pub. Date: Jun. 20, 2019

(65) Prior Publication Data
US 2020/0199414 A1 Jun. 25, 2020

(30) Foreign Application Priority Data
Dec. 15, 2017 (KR) .................. 10-2017-0173551
Dec. 6, 2018 (KR) .................. 10-2018-0156144

(51) Int. Cl.
| C09J 7/38 | (2018.01) |
| C08F 220/18 | (2006.01) |
| C09J 4/00 | (2006.01) |
| C08F 220/14 | (2006.01) |

(52) U.S. Cl.
CPC ............. *C09J 7/385* (2018.01); *C08F 220/14* (2013.01); *C08F 220/1804* (2020.02); *C08F 220/1808* (2020.02); *C09J 4/00* (2013.01); *C08F 2800/20* (2013.01); *C09J 2301/414* (2020.08); *C09J 2433/00* (2013.01)

(58) Field of Classification Search
CPC ................ C09J 7/385; C08F 220/1808; C08F 220/1804; C08F 220/14
See application file for complete search history.

(56) References Cited

U.S. PATENT DOCUMENTS

| 4,876,293 A | 10/1989 | Durney et al. |
| 5,045,569 A * | 9/1991 | Delgado ............ C08F 2/24 521/60 |
| 5,804,301 A | 9/1998 | Curatolo |
| 6,586,510 B1 | 7/2003 | Brown et al. |
| 7,501,475 B2 | 3/2009 | Ootuka et al. |
| 9,040,155 B2 | 5/2015 | Ha et al. |
| 9,353,298 B2 * | 5/2016 | Ha ............ C09J 133/08 |
| 9,856,405 B2 * | 1/2018 | Ha ............ C09D 183/10 |
| 2005/0080181 A1 | 4/2005 | Hirasawa |
| 2008/0293872 A1 | 11/2008 | Loth et al. |
| 2010/0048077 A1 | 2/2010 | Ko et al. |
| 2014/0044961 A1 | 2/2014 | Takami et al. |
| 2014/0065417 A1 | 3/2014 | Higashi et al. |
| 2015/0184032 A1 | 7/2015 | Iwai et al. |
| 2015/0284612 A1 | 10/2015 | Ha et al. |
| 2015/0344746 A1 | 12/2015 | Ha et al. |
| 2017/0081567 A1 | 3/2017 | Ha et al. |
| 2017/0174902 A1 | 6/2017 | Epple et al. |
| 2019/0292414 A1 | 9/2019 | Higashi et al. |
| 2020/0190242 A1 | 6/2020 | Kawai et al. |
| 2020/0199414 A1 | 6/2020 | Seo et al. |

FOREIGN PATENT DOCUMENTS

| CN | 106459711 A | 2/2017 |
| CN | 108003802 A | 5/2018 |
| JP | H02311583 A | 12/1990 |
| JP | 06025630 A * | 2/1994 |
| JP | H06025630 A | 2/1994 |
| JP | 09031432 A * | 2/1997 |
| JP | 2002532611 A | 10/2002 |
| JP | 2006152051 A | 6/2006 |
| JP | 2007039607 A | 2/2007 |

(Continued)

OTHER PUBLICATIONS

Chinese Search Report for Application No. 201880053587.9, dated Feb. 2, 2021, pp. 1-2.
Extended European Search Report with Written Opinion for Application No. 18888844.0 dated Sep. 24, 2020, 7 pages.
International Search Report for Application No. PCT/KR2018/015465 dated Mar. 20, 2019, 2 pages.

*Primary Examiner* — Ling Siu Choi
*Assistant Examiner* — David L Miller
(74) *Attorney, Agent, or Firm* — Lerner, David, Littenberg, Krumholz & Mentlik, LLP

(57) ABSTRACT

A water-based acrylic pressure-sensitive adhesive for clothing and a preparation method thereof are provided. Since a specific internal crosslinking agent is used in a predetermined range during polymerization of an acrylic emulsion resin, a glass transition temperature and an internal crosslinking degree may be controlled while maintaining physical properties of the resin equal to those of the existing adhesives, and thus a residual ratio of the pressure-sensitive adhesive may be greatly reduced at the time of removing the pressure-sensitive adhesive from a substrate such as a fabric for clothing, etc.

4 Claims, No Drawings

(56) References Cited

FOREIGN PATENT DOCUMENTS

| | | |
|---|---|---|
| JP | 2007100009 A | 4/2007 |
| JP | 2008184612 A | 8/2008 |
| KR | 20110060582 A | 6/2011 |
| KR | 101109298 B1 | 1/2012 |
| KR | 20130019967 A | 2/2013 |
| KR | 20130031516 A | 3/2013 |
| KR | 20130031517 A | 3/2013 |
| KR | 20130048913 A | 5/2013 |
| KR | 101345149 B1 | 12/2013 |
| KR | 20130133721 A | 12/2013 |
| KR | 20160036835 A | 4/2016 |
| KR | 101802364 B1 | 12/2017 |
| WO | 2008143010 A1 | 11/2008 |
| WO | 2009084511 A1 | 7/2009 |
| WO | 2012077676 A1 | 6/2012 |
| WO | 2015022825 A1 | 2/2015 |
| WO | 2016027993 A1 | 2/2016 |
| WO | 2016047308 A1 | 3/2016 |
| WO | 2017216108 A1 | 12/2017 |
| WO | 2020091467 A1 | 5/2020 |

\* cited by examiner

WATER-BASED ACRYLIC PRESSURE-SENSITIVE ADHESIVE FOR CLOTHING, AND PREPARATION METHOD THEREOF

CROSS-REFERENCE TO RELATED APPLICATIONS

The present application is a national stage entry under 35 U.S.C. § 371 of International Application No. PCT/KR2018/015465 filed on Dec. 7, 2018, which claims priority to Korean Patent Application Nos. 10-2017-0173551 and 10-2018-0156144, filed on Dec. 15, 2017 and Dec. 6, 2018, respectively, the disclosures of which are hereby incorporated by reference herein in their entirety.

TECHNICAL FIELD

The present invention relates to a water-based acrylic pressure-sensitive adhesive for clothing, which exhibits a greatly improved residue property at the time of removing the pressure-sensitive adhesive from a fabric for clothing, etc., and a preparation method thereof.

BACKGROUND

Recently, sticker-type surface finishing materials such as interior/exterior materials of buildings, interior design materials, advertising materials, etc., in which pressure-sensitive adhesives (PSAs) are employed, have been increasingly used. Conventional oil-based pressure-sensitive adhesives as the pressure-sensitive adhesives incur discharge of residual solvents into air for a long period of time after construction, and thus residents of buildings suffer symptoms such as headache, eye, nose, and throat irritation, cough, itching, dizziness, fatigue, reduction in concentration, etc., and long-term exposure to such residual solvents may generate a problem of sick house syndrome that causes respiratory ailments, heart disease, cancer, etc.

For such reasons, water-based emulsion pressure-sensitive adhesives, which are environmentally friendly by using water as a dispersion medium and do not discharge harmful materials to human body, have received much attention and are rapidly replacing oil-based adhesives. Such water-based emulsion pressure-sensitive adhesives may use polymers having higher molecular weight than that of solvent-based polymers because viscosity of the pressure-sensitive adhesive is not related to molecular weights of polymers as dispersions, may have broad concentration ranges of solid content, have low aging resistance, low viscosity, and good adhesive strength in a low solid content region, and have good compatibility with other polymers.

However, due to use of water as a solvent, such water-based emulsion pressure-sensitive adhesives have a slow drying rate, low adhesive strength to hydrophobic adhesive surfaces and non-porous substrates, narrow ranges of selection of curing agents, and deteriorated initial adhesive strength. In addition, water-based emulsion pressure-sensitive adhesives include emulsifiers and dispersants, and thus have no superior physical properties, such as low water resistance, etc., to those of oil-based pressure-sensitive adhesive.

Further, the water-based pressure-sensitive adhesive for clothing is difficult to exhibit adhesive properties due to a lot of dust on the clothing fabric itself, and in many cases, after attaching, the pressure-sensitive adhesive is more attached to the fabric than the label. In particular, it is necessary to develop a pressure-sensitive adhesive that has excellent adhesive strength with respect to fabrics for clothing while exhibiting a characteristic of being cleanly removed from a substrate. Since such two properties are incompatible with each other, any one property is enhanced and the other is deteriorated, and thus there is a problem in that both of them are not satisfied at the same time.

DETAILED DESCRIPTION OF THE INVENTION

Technical Problem

The present invention provides a water-based acrylic pressure-sensitive adhesive for clothing which has excellent adhesive strength with respect to a fabric for clothing to maintain high physical properties while exhibiting a great improvement in residue property of leaving the pressure-sensitive adhesive residues on a fabric substrate for clothing when the pressure-sensitive adhesive is removed from the fabric substrate for clothing, and a preparation method thereof.

Technical Solution

According to one embodiment of the present invention, a water-based acrylic pressure-sensitive adhesive for clothing is provided, which includes an acrylic emulsion resin which is prepared by emulsion polymerization of a monomer mixture including a (meth)acrylic acid ester monomer and one or more comonomers including a functional group selected from the group consisting of a hydroxy group, an epoxy group, a cyano group, a styrene group, and a carboxyl group in the presence of an internal crosslinking agent, wherein the internal crosslinking agent is one or more selected from the group consisting of allyl methacrylate, polyethylene glycol diacrylate, polycarbodiimide, allyl-N-methyl carbamate, 1,6-hexanediol diacrylate, hexanediol ethoxylate diacrylate, hexanediol propoxylate diacrylate, pentaerythritol ethoxylate triacrylate, pentaerythritol propoxylate triacrylate, vinyltrimethoxysilane, and divinylbenzene, and the internal crosslinking agent is included in an amount of 0.02 parts by weight to 0.25 parts by weight with respect to 100 parts by weight of the acrylic emulsion resin.

Further, according to another embodiment of the present invention, a method of preparing the above-described water-based acrylic pressure-sensitive adhesive for clothing is provided, which includes the steps of:

preparing a pre-emulsion by mixing the monomer mixture including the (meth)acrylic acid ester monomer and one or more comonomers including a functional group selected from the group consisting of a hydroxy group, an epoxy group, a cyano group, a styrene group, and a carboxyl group, and the internal crosslinking agent with water; and preparing the acrylic emulsion resin by performing emulsion polymerization of the pre-emulsion, wherein the internal crosslinking agent is one or more selected from the group consisting of allyl methacrylate, polyethylene glycol diacrylate, polycarbodiimide, allyl-N-methyl carbamate, 1,6-hexanediol diacrylate, hexanediol ethoxylate diacrylate, hexanediol propoxylate diacrylate, pentaerythritol ethoxylate triacrylate, pentaerythritol propoxylate triacrylate, vinyltrimethoxysilane, and divinylbenzene, and the internal crosslinking agent is mixed in an amount of 0.02 parts by weight to 0.25 parts by weight with respect to 100 parts by weight of the monomer mixture.

Hereinafter, the present invention will be described in more detail. The terms or words used in the present specification and claims should not be limitedly interpreted as common or dictionary meanings, and should be interpreted as meanings and concepts which accord with the technical spirit of the invention based on the principle that an inventor may appropriately define the concepts of terms and words in order to describe his/her invention the best way.

Further, the meaning of "including or includes" used herein specifies stated features, regions, integers, steps, operations, elements, and/or components, but do not preclude the presence or addition of other features, regions, integers, steps, operations, elements, and/or components.

Hereinafter, the preferred water-based acrylic pressure-sensitive adhesive for clothing and the preparation method thereof according to the present invention will be described in more detail.

Water-Based Acrylic Pressure-sensitive Adhesive for Clothing

According to one embodiment of the present invention, a water-based acrylic pressure-sensitive adhesive for clothing is provided, which includes an acrylic emulsion resin which is prepared by emulsion polymerization of a monomer mixture including a (meth)acrylic acid ester monomer and one or more comonomers including a functional group selected from the group consisting of a hydroxy group, an epoxy group, a vinyl ester group, a cyano group, a styrene group, and a carboxyl group in the presence of an internal crosslinking agent, wherein the internal crosslinking agent is one or more selected from the group consisting of allyl methacrylate, polyethylene glycol diacrylate, polycarbodiimide, allyl-N-methyl carbamate, 1,6-hexanediol diacrylate, hexanediol ethoxylate diacrylate, hexanediol propoxylate diacrylate, pentaerythritol ethoxylate triacrylate, pentaerythritol propoxylate triacrylate, vinyltrimethoxysilane, and divinylbenzene, and the internal crosslinking agent is included in an amount of 0.02 parts by weight to 0.25 parts by weight with respect to 100 parts by weight of the acrylic emulsion resin.

In the present specification, the water-based acrylic pressure-sensitive adhesive, which is an acrylic emulsion pressure-sensitive adhesive using water as a dispersion medium, includes the acrylic emulsion resin having water resistance and adhesive property with respect to a fabric for clothing.

Further, the term "monomer mixture", as used herein, refers to a state in which one or more monomers described below are mixed together, based on acrylic monomers. The monomer mixture may be prepared by introducing one or more monomers at the same time or by introducing the monomers sequentially, and thus the preparation method thereof is not limited. Further, the monomer mixture is not particularly limited, as long as the acrylic emulsion resin is polymerized therefrom, and one or more of various monomers well known in the art may be used.

The present inventors carried out a continuous experiment in order to solve a residue problem of leaving a lot of adhesive components on the fabric at the time of removing the existing water-based pressure-sensitive adhesive for clothing. According to experimental results, when a kind and a content of a specific internal crosslinking agent are changed, a residual ratio may be reduced at the time of removing the water-based pressure-sensitive adhesive from the fabric for clothing while maintaining physical properties equivalent to or higher than those of the existing water-based pressure-sensitive adhesive, thereby completing the present invention.

Preferably, the internal crosslinking agent is one or more selected from the group consisting of allyl methacrylate, polyethylene glycol diacrylate, polycarbodiimide, allyl-N-methyl carbamate, 1,6-hexanediol diacrylate, hexanediol ethoxylate diacrylate, hexanediol propoxylate diacrylate, pentaerythritol ethoxylate triacrylate, pentaerythritol propoxylate triacrylate, vinyltrimethoxysilane, and divinylbenzene.

In particular, the internal crosslinking agent is the most basic component which is added to the reaction mixture in order to reinforce cohesion, and is characterized by having a high holding power (shear), and serves to connect a long polymer chain, thereby obtaining an excellent effect of increasing the net effect. The most important feature of the holding power (shear) is high cohesion between the polymers, which helps to keep dried latex firmly fixed without being easily torn off. Further, this also plays a role in preventing a film produced in a roll form from leaking sideways due to its weight. The internal crosslinking agents are characterized by having reactive double bonds or acrylate groups to both ends of the molecule.

Further, the internal crosslinking agent is preferably included in an amount of about 0.02 parts by weight to about 0.25 parts by weight, or about 0.024 parts by weight to about 0.15 parts by weight, or about 0.029 parts by weight to about 0.1 part by weight, or about 0.029 parts by weight to about 0.07 parts by weight with respect to 100 parts by weight of the acrylic emulsion resin. When the use of the internal crosslinking agent is less than about 0.02 parts by weight, there is a residue problem of leaving the pressure-sensitive adhesive on clothing, and when the use of the internal crosslinking agent is more than about 0.25 parts by weight, there is a problem in that it does not stick to clothing. Respective different factors may be generated, but there is a feature in that it may sensitively act on attachment to clothing even with small changes thereof.

Here, 100 parts by weight of the acrylic emulsion resin refers to the sum of the content of the (meth) acrylic acid ester monomer, the content of the comonomer including a functional group selected from the group consisting of a hydroxy group, an epoxy group, a cyano group, a styrene group, and a carboxyl group, and the content of an external crosslinking agent used in the emulsion polymerization process. For example, 100 parts by weight of the acrylic emulsion resin does not include a content of a component which is added after a polymerization process as described below, even though it is the external crosslinking agent.

The present invention focuses on improving the residue property of leaving the pressure-sensitive adhesive on a fabric for clothing while maintaining physical properties the same as before.

In particular, when the method of the present invention is used during the process of polymerizing the water-based pressure-sensitive adhesive for clothing, it is possible to improving the residue property while maintaining physical properties the same as before. In this case, it is possible to overcome the residue problem on the fabric for clothing while maintaining high physical properties, as compared with the existing method of removing the pressure-sensitive adhesive remaining on the substrate by reducing the adhesive strength.

The water-based acrylic pressure-sensitive adhesive of one embodiment may include the acrylic emulsion resin which is prepared by emulsion polymerization of the monomer mixture including the (meth)acrylic acid ester monomer and one or more comonomers including a functional group selected from the group consisting of a hydroxy group, an epoxy group, a cyano group, a styrene group, and a carboxyl group in the presence of an internal crosslinking agent, as described above.

The (meth)acrylic acid ester monomer is a (meth)acrylic acid ester monomer having a C1-C18 alkyl group, i.e., an alkyl group having 1 to 18 carbon atoms, and any material is not limited, as long as it is a material known in the art. For example, the (meth)acrylic acid ester monomer may be one or more selected from the group consisting of methyl(meth)acrylate, ethyl(meth)acrylate, propyl(meth)acrylate, isopropyl(meth)acrylate, butyl(meth)acrylate, isobutyl(meth)acrylate, t-butyl(meth)acrylate, n-amyl(meth)acrylate, isoamyl (meth)acrylate, n-hexyl(meth)acrylate, n-heptyl(meth)acrylate, n-octyl(meth)acrylate, t-octyl(meth)acrylate, n-ethylhexyl(meth)acrylate, 2-ethyl hexyl(meth)acrylate, decyl(meth)acrylate, isodecyl(meth)acrylate, tridecyl(meth)acrylate, stearyl(meth)acrylate, isostearyl(meth)acrylate, phenyl(meth)acrylate, benzyl(meth)acrylate, dodecyl(meth)acrylate, cyclohexyl(meth)acrylate, lauryl(meth)acrylate, ceryl(meth)acrylate, glycidyl(meth)acrylate, and stearyl (meth)acrylate, which may be used in combination of two or more thereof. Specifically, one or two or more selected from methyl(meth)acrylate, ethyl(meth)acrylate, butyl(meth)acrylate, and 2-ethylhexyl(meth)acrylate may be preferably used.

The (meth)acrylic acid ester monomer may be included in an amount of about 30% by weight or more, or about 30% by weight to about 99% by weight, or about 45% by weight or more, or about 55% by weight or more, or about 80%% by weight or more, or about 80% by weight or more to about 98.5% by weight based on the total weight of the monomer mixture. If the content of the (meth)acrylic acid ester monomer is less than about 30% by weight, an initial adhesive strength may not be secured, and thus there is a problem in that it does not stick to clothing. However, when the monomer consists of only the (meth)acrylic acid ester monomer, it is not preferred that a lot of residues of the pressure-sensitive adhesive are left on an attachment material at the time of being removed after use, and washing property is reduced.

In a more preferred embodiment of the present invention, among the (meth)acrylic acid ester monomers, the methyl (meth)acrylate is included in an amount of about 5% by weight to about 25% by weight, or about 8% by weight to about 20% by weight, or about 10% by weight to about 18% by weight, based on the total weight of the monomer mixture, and the remaining (meth)acrylic acid ester monomers, such as butyl(meth)acrylate, 2-ethylhexyl(meth)acrylate, etc., may be included in an amount of about 25% by weight or more or, about 25% by weight to about 94% by weight, or about 40% by weight or more, or about 40% by weight to about 88% by weight, or about 50% by weight or more, or about 50% by weight to about 85% by weight, or about 60% by weight or more, or about 55% by weight to about 83% by weight in the monomer mixture. In particular, when the monomer consists of only a monomer having a long-chain alkyl group such as butyl(meth)acrylate, 2-ethylhexyl(meth)acrylate, etc., a glass transition temperature (Tg) of the resin becomes very low, and a soft polymer is formed. In this case, a lot of residues are generated, and for this reason, a proper composition of the monomer and the comonomer is preferred. In particular, physical properties of the pressure-sensitive adhesive are the result of the glass transition temperature (Tg) of the resin, and therefore, the content ratio of the monomer and the comonomer is important. It is preferable that appropriate adhesive properties are obtained by adjusting the ratio of the remaining monomers.

The monomer mixture further includes one or more comonomers including one or two or more selected from the group consisting of a hydroxy group, an epoxy group, a cyano group, a styrene group, and a carboxyl group, together with the (meth)acrylate-based monomer. Among them, a comonomer including a benzene group is preferably used in terms of stability.

The comonomers may be added in an amount of about 10 parts by weight or less, or about 0 part by weight to about 10 parts by weight, or about 6 parts by weight or less, or about 1 part by weight to about 6 parts by weight, or about 4 parts by weight or less, or about 2 parts by weight to about 4 parts by weight with respect to 100 parts by weight of the (meth)acrylic acid ester monomer. If the content of the comonomer is more than 10 parts by weight, it becomes excessively solid, and thus adhesive strength may be deteriorated, which is not preferred. However, the pressure-sensitive adhesive becomes too flexible, and thus excessive adhesive property occurs to leave residues. Accordingly, it is preferable that the comonomers are included in a minimum amount or more.

As one example of the comonomers, a monomer including a hydroxy group may include hydroxyethyl (meth)acrylate, hydroxypropyl (meth)acrylate, hydroxybutyl (meth)acrylate, hydroxyhexyl (meth)acrylate, hydroxyoctyl (meth)acrylate, hydroxydecyl (meth)acrylate, hydroxylauryl (meth)acrylate, and hydroxypropyleneglycol (meth)acrylate, but is not limited thereto. Here, the monomer including the hydroxy group may be mixed and reacted in an amount of about 10 parts by weight or less, or about 0 part by weight to about 10 parts by weight, or about 5 parts by weight or less, or about 1 part by weight to about 5 parts by weight, preferably about 1 part by weight to about 3 parts by weight with respect to 100 parts by weight of the (meth)acrylic acid ester monomer.

The monomer including the epoxy group may include glycidyl methacrylate and allylglycidyl ether, but is not limited thereto. Here, the monomer including the epoxy group may be mixed and reacted in an amount of about 10 parts by weight or less, or about 0 part by weight to about 10 parts by weight, or about 5 parts by weight or less, or about 1 part by weight to 5 parts by weight, preferably about 1 part by weight to about 3 parts by weight with respect to 100 parts by weight of the (meth)acrylic acid ester monomer.

The monomer including the cyano group may include acrylonitrile and methacrylonitrile, but is not limited thereto. Here, the monomer including the cyano group may be mixed and reacted in an amount of about 10 parts by weight or less, or about 0 part by weight to about 10 parts by weight, or about 5 parts by weight or less, or about 1 part by weight to about 5 parts by weight, preferably about 1 part by weight to about 3 parts by weight with respect to 100 parts by weight of the (meth)acrylic acid ester monomer.

The styrene-based monomer including the styrene group may include styrene and α-methyl styrene, but is not limited thereto. Here, the styrene-based monomer may be mixed and reacted in an amount of about 10 parts by weight or less, or about 0 part by weight to about 10 parts by weight, or about 6 parts by weight or less, or about 1 part by weight to about 6 parts by weight, preferably about 1 part by weight to about 4 parts by weight with respect to 100 parts by weight of the (meth)acrylic acid ester monomer.

Further, the monomer including the carboxyl group may include acrylic acid, itaconic acid, maleic anhydride, fumaric acid, crotonic acid, methacrylic acid, and ethyl methacrylic acid, but is not limited thereto. In particular, the monomer including the carboxyl group is used to improve storage stability of latex. Here, the monomer including the carboxyl group may be mixed and reacted in an amount of about 10 parts by weight or less, or about 0 part by weight to about 10 parts by weight, or about 5 parts by weight or less or about 1 part by weight to about 5 parts by weight, preferably about 1 part by weight to about 3 parts by weight with respect to 100 parts by weight of the (meth)acrylic acid ester monomer.

In particular, according to one preferred embodiment of the present invention, the monomer mixture may include the (meth)acrylic acid ester monomer in an amount of about 55% by weight to about 99% by weight, or about 80% by weight to about 98.5% by weight, the comonomer including the styrene group in an amount of about 0.5% by weight to about 10% by weight, or about 1% by weight to about 5% by weight, and the comonomer including the carboxyl group in an amount of about 0.5% by weight to about 10% by weight, or about 0.5% by weight to about 3% by weight, under conditions where the total weight of the mixture is 100% by weight. Specifically, the monomer mixture may include, for example, 2-ethylhexylacrylate (2-EHA) in an amount of about 30% by weight to about 60% by weight, or about 45% by weight to about 55% by weight, styrene (SM) in an amount of about 0.5% by weight to about 10% by weight, or about 1% by weight to about 5% by weight, methyl methacrylate (MMA) in an amount of about 5% by weight to about 25% by weight, or about 10% by weight to about 20% by weight, butyl acrylate (BA) in an amount of about 20% by weight to about 40% by weight, or about 25% by weight to about 35% by weight, and acrylic acid (AA) in an amount of about 0.5% by weight to about 10% by weight, or about 0.5% by weight to about 3% by weight.

Further, according to one embodiment of the present invention, the acrylic emulsion resin may include other additives without particular limitation within a range that does impair the desired effect of the present invention, in addition to the above-described components, etc. Examples of the additives may include a surfactant, a buffering agent, an external crosslinking agent, a wetting agent, etc., and among them, one or two or more may be further included.

Specifically, a surfactant that is used for initial particle production during the polymerization reaction, size adjustment of the produced particles, and particle stability may be further included. The surfactant consists of a hydrophilic group and a lipophilic group, and is classified into an anionic surfactant, a cationic surfactant, and a non-ionic surfactant. Anionic and non-ionic surfactants are mainly used, and may be used in combination to complement mechanical stability and chemical stability. The surfactant may include, for example, sodium polyethylene alkyl ether sulfate (sodium polyoxyethylene alkyl ether sulfate, the kind varies according to EO group), diphenyl oxide disulfonate, sodium lauryl sulfate, sodium alkyldiphenyl oxide disulfonate, or sodium methylallyl sulfonate, etc., but is not limited thereto.

Further, the surfactant may be used alone or in a mixture of two or more thereof. For example, the surfactant having a phenyl group may attract non-polar monomers well, and the surfactant having a methyl allyl group may accommodate many monomers because the molecule is not large.

In particular, each surfactant composition may be adjusted slightly, but the surfactants may be included in a total amount of about 1.3 parts by weight or less, or about 0 part by weight to about 1.3 parts by weight, or about 1 part by weight or less, or about 0.3 parts by weight to about 1 part by weight, or about 0.8 parts by weight or less, or about 0.5 parts by weight to about 0.8 parts by weight with respect to 100 parts by weight of the acrylic emulsion resin. When the surfactants are included in an amount of more than about 1.3 parts by weight, adhesive properties may be changed, which is not preferred. For example, with regard to the composition of the surfactant, sodium polyethylene alkyl ether sulfate may be included in an amount of about 0.2 parts by weight to about 0.8 parts by weight or about 0.3 parts by weight to about 0.7 parts by weight, and diphenyl oxide disulfonate and sodium lauryl sulfate may be included in an amount of about 0.1 part by weight to about 0.5 parts by weight or about 0.2 parts by weight to 0.4 parts by weight, respectively.

Further, to control pH in the polymerization reaction and to impart polymerization stability, an electrolyte or a buffering agent (buffer) may be further included, and sodium bicarbonate, sodium carbonate, sodium phosphate, sodium sulfate, sodium chloride, etc., may be exemplified, but is not limited thereto. Further, these may be used alone or in a mixture of two or more thereof. The buffering agent may be included in an amount of about 0.5 parts by weight or less, or about 0 part by weight to about 0.5 parts by weight, or about 0.3 parts by weight or less, or about 0 part by weight to about 0.3 parts by weight with respect to 100 parts by weight of the acrylic emulsion resin.

Further, an external crosslinking agent which is further added to the acrylic emulsion resin at the end of the polymerization process and functions as an intercross linker to link between polymers may be further included. Specifically, it was designed that a crosslinking reaction is allowed to additionally occur outside by using diacetone acrylamide (DAAM) and adipic acid dihydrazide (ADH) as the external crosslinking agent. The external crosslinking agents may be included in a total amount of about 1.5 parts by weight or less, or about 0 part by weight to 1.5 parts by weight, or about 1.2 parts by weight or less, or about 0.5 parts by weight to about 1.2 parts by weight, or about 0.9 parts by weight or less, or about 0.6 parts by weight to 0.9 parts by weight with respect to 100 parts by weight of the acrylic emulsion resin.

Further, a wetting agent that serves as an emulsifying agent to decrease surface tension for coating property may be further included, and it may be used in an amount within the range well known in the art. Examples of the wetting agent may include a dioctyl sodium sulfosuccinate-based compound, and may be included in an amount of about 1.5 parts by weight or less, or about 0.5 parts by weight to about 1.5 parts by weight, or about 1.2 parts by weight or less, or about 0.8 parts by weight to about 1.2 parts by weight with respect to 100 parts by weight of the acrylic emulsion resin.

Meanwhile, a molecular weight modifier that serves as a chain transfer agent (CTA) during the polymerization reaction of the resin, specifically, plays a role in transferring radicals to another site and terminating the reaction by binding to the terminus of the polymer may be further included. However, at the time of being used as a pressure-sensitive adhesive for clothing, a lot of residues may be left. Therefore, the molecular weight modifier may be used rarely or in a small amount to decrease the molecular weight, and thus plays a role in improving the initial adhesive strength. For example, 3-mercaptopropionic acid, which is shorter than the existing well-known n-DDM (1-dodecanethiol) and may perform modification even though used in only a small amount, may also be used in a trace amount. Even in this case, however, there are many possibilities of generating the residue problem, and therefore, it is preferable that the molecular weight modifier is rarely used in the pressure-sensitive adhesive for clothing.

The acrylic emulsion resin may have a glass transition temperature (Tg) of about −60° C. to −20° C., or about −50° C. to −30° C., or about −45° C. to −40° C. The glass transition temperature (Tg) of the acrylic emulsion resin may be measured using a differential scanning calorimeter (DSC, apparatus name: DSC 2920, manufacturer: TA instrument). Specifically, the acrylic emulsion resin is heated to 80° C., and maintained at the temperature for 5 minutes. Then, the acrylic emulsion resin is again cooled to −50° C., and then the temperature is raised. At this time, the rate of rise and fall of the temperature was adjusted to 5° C./min, respectively. In the $2^{nd}$ temperature rising step ($2^{nd}$ cycle), the glass transition temperature (Tg) of the acrylic emulsion resin may be measured.

Method of Preparing Water-Based Acrylic Pressure-Sensitive Adhesive for Clothing According to another embodiment of the present invention, a method of preparing the above-described water-based acrylic pressure-sensitive adhesive for clothing is provided.

The method of preparing the water-based acrylic pressure-sensitive adhesive for clothing according to the present invention includes the steps of:

preparing a pre-emulsion by mixing the monomer mixture including the (meth)acrylic acid ester monomer and one or more comonomers including a functional group selected from the group consisting of a hydroxy group, an epoxy group, a cyano group, a styrene group, and a carboxyl group, and the internal crosslinking agent with water; and preparing the acrylic emulsion resin by performing emulsion polymerization of the pre-emulsion, wherein the internal crosslinking agent is one or more selected from the group consisting of allyl methacrylate, polyethylene glycol diacrylate, polycarbodiimide, allyl-N-methyl carbamate, 1,6-hexanediol diacrylate, hexanediol ethoxylate diacrylate, hexanediol propoxylate diacrylate, pentaerythritol ethoxylate triacrylate, pentaerythritol propoxylate triacrylate, vinyltrimethoxysilane, and divinylbenzene, and the internal crosslinking agent is mixed in an amount of 0.02 parts by weight to 0.25 parts by weight with respect to 100 parts by weight of the monomer mixture.

In particular, the internal crosslinking agent is preferably mixed in an amount of about 0.02 parts by weight to about 0.25 parts by weight, or about 0.024 parts by weight to about 0.15 parts by weight, or about 0.029 parts by weight to about 0.1 part by weight, or about 0.029 parts by weight to about 0.07 parts by weight with respect to 100 parts by weight of the monomer mixture. When the use of the internal crosslinking agent is less than about 0.02 parts by weight, there is a residue problem of leaving the finally prepared pressure-sensitive adhesive on clothing, and when the use of the internal crosslinking agent is more than about 0.25 parts by weight, there is a problem in that it does not stick to clothing. Respective different factors may be generated, but there is a feature in that it may sensitively act on attachment to clothing even with small changes thereof.

The method according to one embodiment of the present invention includes processes of preparing the pre-emulsion by using the specific internal crosslinking agent in the optimal range, preparing the acrylic emulsion resin by adding the surfactant, the initiator, etc. to the pre-emulsion, and then preparing the acrylic pressure-sensitive adhesive by using the first and second external crosslinking agents.

Specifically, each step of the method of the present invention will be described.

The step of preparing the pre-emulsion may include the step of taking the monomer mixture including the (meth)acrylic acid ester monomer and one or more comonomers including a functional group selected from the group consisting of a hydroxy group, an epoxy group, a cyano group, a styrene group, and a carboxyl group, and the internal crosslinking agent in the above-described amounts, respectively, and then mixing them with water, followed by stirring for a predetermined time.

The components, compositions, and contents of the (meth)acrylic acid ester monomer, the comonomer including a functional group selected from the group consisting of a hydroxy group, an epoxy group, a cyano group, a styrene group, and a carboxyl group, and the internal crosslinking agent are the same as described above.

Further, the pre-emulsion may include other additives without particular limitation within a range that does impair the desired effect of the present invention, in addition to the (meth)acrylic acid ester monomer, the comonomer, and the internal crosslinking agent. For example, the additives may include a surfactant, a buffering agent, an external crosslinking agent, a wetting agent, etc. Among them, one or two or more may be further included.

The components, compositions, and contents of other additives such as the surfactant, the buffering agent, the external crosslinking agent, the wetting agent, etc. are the same as described above.

To facilitate the preparation of the pre-emulsion, the order of adding the components is important. It is preferred that at the beginning of the polymerization process, the additives such as the surfactant, the buffering agent, etc. are first dissolved in water under stirring, and then the monomer mixture of the (meth)acrylic acid ester monomer and the comonomer, and the internal crosslinking agent are introduced while stirring.

Meanwhile, in the step of preparing the acrylic emulsion resin, the pre-emulsion prepared above may be introduced with the polymerization initiator by adjusting the ratio thereof. Further, in order to express the characteristic of the external crosslinking agent, a crosslinking point must exist outside the polymer, and thus the reaction may be carried out by introducing the external crosslinking agent into the pre-emulsion at the end of the polymerization. At the time of terminating the polymerization, emulsion polymerization may be carried out in the presence of the external crosslinking agent.

In particular, the polymerization initiator may be a water-soluble polymerization initiator, such as a persulfate of ammonium or an alkali metal, hydrogen peroxide, peroxide, a hydroperoxide, etc., and may be used in combination with one or more reducing agents to implement the emulsion polymerization at a low temperature, but is not limited thereto. At this time, the polymerization initiator may be used in an amount of about 0.1 part by weight to about 1.5 parts by weight, based on 100 parts by weight of the acrylic emulsion resin. Further, the polymerization initiator may be appropriately used within the above-described range by dividing once or more during the polymerization step of the acrylic emulsion resin to be described later. Further, the external crosslinking agent which is further added to the acrylic emulsion resin at the end of the polymerization process and functions as an intercross linker to link between polymers may be further included.

The emulsion polymerization may be performed at a temperature of about 70° C. to about 90° C. for about 3 hours to about 8 hours. In addition, taking into consideration the physical properties of the pressure-sensitive adhesive, the polymerization temperature may be about 75° C. to about 85° C. Further, the polymerization initiator may be adjusted by a method of using the polymerization initiator alone or a mixture of the polymerization initiator and one or more of the reducing agents. The components of the polymerization initiator and the reducing agent used in the polymerization reaction may employ the components and contents used in the above-described acrylic emulsion resin of the present invention without particular limitation. In the present invention, to reduce residual monomers, a known stripping process has been applied to remove the residual monomers with water using a vacuum. However, in recent years, the feeding time of the polymerization initiator is prolonged, and aging at a high temperature is further carried out to prolong the time for additional reaction. When the reaction is sustained at a high temperature, the change over time is significantly reduced and a more stable product may be provided.

For reaction stability and easy adjustment of pH, the electrolyte or the buffering agent may be further introduced in the polymerization step, and specific components thereof may employ the components used in the above-described acrylic emulsion resin of the present invention without particular limitation. Further, a wetting agent that serves as an emulsifying agent to decrease surface tension for coating property may be further used. Specific components thereof may employ the components used in the above-described acrylic emulsion resin of the present invention without particular limitation. However, instead of applying a post-process of introducing the electrolyte or the buffering agent, the wetting agent, and other additives at room temperature, they may be introduced in the aging state of a high temperature after completion of the polymerization, thereby obtaining a product having a stable viscosity and pH.

The water-based acrylic pressure-sensitive adhesive provided according to this method may be particularly applied to a pressure-sensitive adhesive for clothing. Therefore, the water-based acrylic pressure-sensitive adhesive may be effectively applied to a fabric substrate for clothing. Then, at the time of removing the pressure-sensitive adhesive, the pressure-sensitive adhesive may have the reduced residual ratio while meeting the physical properties equivalent to or higher than those of the existing pressure-sensitive adhesives. For example, the residual ratio of the acrylic pressure-sensitive adhesive according to the present invention with respect to fabrics for clothing may be reduced to at least about 8% or less, or about 0% to about 8%, and more preferably, the residual ratio of the acrylic pressure-sensitive adhesive may be about 6% or less, or about 0% to about 6%, or about 5% or less, or about 0 to about 5%, or about 4.5% or less, or about 0% to about 4.5%.

The same analysis method as in KOTITI which is an institute for testing textile products may be applied to the residual ratio. A label sample is pressed on a selected fabric for clothing five times using a roller of about 5 kg load, and then sandwiched between the glass using a glass specimen (4 or 5 samples stacked), and the attached sample is pressed with a load of about 5 kg in a thermohygrostat at a temperature of about 60° C. and a relative humidity of 95%, and then aged for 3 days (put a weight of 5 kg on the glass specimen during storage). Here, as the fabric for clothing, a 100% polyester fabric or a 100% cotton fabric, or a blended fabric of 52% polyester and 48% cotton is used. The sample thus aged for 3 days is taken, and left in a thermohygrostat (about 24° C. and about 60%) for 24 hours while applying about 5 kg of the weight. Thereafter, the sample is taken, and the label sample is removed by a 180° peel test using TA (Texture Analysers). The amount of pressure-sensitive adhesive that remains on the fabric substrate for clothing is determined as the residual ratio.

Further, according to the present invention, the acrylic pressure-sensitive adhesive may exhibit all excellent values of peel strength, initial adhesive strength (loop tack), and holding power (shear), in addition to improvement of the residual ratio.

For example, the water-based acrylic pressure-sensitive adhesive may exhibit peel strength (90° peel) of about 2.4 N/inch or more, or about 2.4 N/inch to about 12 N/inch, or about 3.0 N/inch or more, or about 3.0 N/inch to about 12 N/inch, or about 4.0 N/inch or more, or about 4.0 N/inch to about 12 N/inch. Here, the peel strength (peel) may be measured in accordance with FINAT TEST METHOD NO. 2. For example, the label specimen of the acrylic emulsion pressure-sensitive adhesive for clothing is attached to a glass or HDPE, bright stainless steel plate substrate by reciprocating about 2 kg roller once or more at a speed of about 300 mm/min, and aged at room temperature for about 20 minutes, and then peeled off at an angle of 90° and a speed of about 300 mm/min using TA Texture Analyzer. The target value may be about 2.4 N/inch or more, preferably about 3.0 N/inch or more, with respect to the stainless steel plate.

The water-based acrylic pressure-sensitive adhesive may have initial adhesive strength (loop tack) of about 6.0 N/inch or more, or about 6.0 N/inch to about 24 N/inch, or about 9.0 N/inch or more, or about 9.0 N/inch to about 24 N/inch with respect to a glass plate, and about 2.5 N/inch or more, or about 2.5 N/inch to about 12 N/inch, or about 3.0 N/inch or more, or about 3.0 N/inch to about 12 N/inch with respect to a HDPE film. Here, the initial adhesive strength (Loop tack) may be measured by using a glass or high-density polyethylene (HDPE) film as an attachment substrate, and is a value measured under conditions of a temperature of about $22\pm2°$ C. and a relative humidity of about $5\pm5\%$ RH. For example, the specimen is looped and fixed in clamps, and the specimen is attached to the glass or high density polyethylene (HDPE) film at a constant speed. About 5 seconds later, the maximum force which is needed to detach in the opposite direction by applying a measurement speed of about 300 mm/min is determined as loop tack strength. The target value may be about 6.0 N/inch or more, preferably about 9.0 N/inch or more with respect to the glass plate, and about 2.5 N/inch or more, preferably about 3.0 N/inch or more with respect to the HDPE film.

The water-based acrylic pressure-sensitive adhesive may have a holding power (shear) of about 3600 minutes or more, or about 4500 minutes or more, or about 4800 minutes or more. Here, the holding power (shear) may be measured by a holding power test (shear test), and is a value measured under conditions of a temperature of about $22\pm2°$ C. and a relative humidity of about $5\pm5\%$ RH. For example, a bright stainless steel plate (bright SUS: polished and more slippery) is prepared, and the pressure-sensitive adhesive specimen is attached to the attachment surface by reciprocating about 2 kg roller once, and the holding power is measured without dwell time. A fixed load of about 1 kg is applied to the bottom of the sample, and the time when the pressure-sensitive adhesive sample is dropped is measured. The target value may be about 3600 minutes or more.

ADVANTAGEOUS EFFECTS

In the present invention, during a process of polymerizing a water-based pressure-sensitive adhesive for clothing, when an internal crosslinking agent such as allyl methacrylate, etc., is used by optimizing its content in a predetermined range, there are effects of obtaining stable residue property at the time of removing the pressure-sensitive adhesive, together with effective adhesive strength with respect to a fabric for clothing, while maintaining physical properties equivalent to or higher than those of the existing pressure-sensitive adhesives.

DETAILED DESCRIPTION OF THE EMBODIMENTS

Hereinafter, the actions and effects of the present invention will be described in more detail with reference to the specific examples of the present invention. However, these are suggested for illustrative purposes only, and the scope of the present invention is not intended to be limited thereby in any sense.

EXAMPLES

Example 1

A pre-emulsion was prepared by mixing a monomer mixture and an internal crosslinking agent with water as follows, and then the pre-emulsion was subjected to emulsion polymerization to prepare an acrylic emulsion resin.

First, to a 2 L-volume glass reactor equipped with a thermostat, a stirrer, a dropping funnel, a nitrogen feeding tube, and a reflux condenser, about 290.2 g of water and about 1.9 g of 26 wt % sodium polyoxyethylene lauryl ethersulfate as a first surfactant were added. Air inside the reactor was replaced with nitrogen while stirring, and then the temperature was raised to about 80° C. under nitrogen atmosphere, and maintained about for 60 minutes.

Separately, about 314.9 g of butylacrylate (BA), about 503.0 g of 2-ethylhexylacrylate (2-EHA), about 151.3 g of methylmethacrylate (MMA), about 20.3 g of styrene (SM), and about 10.5 g of acrylic acid (AA) were put in a beaker, and mixed for about 30 minutes to prepare 1000.0 g of a monomer mixture. To the monomer mixture, a solution composed of about 0.3 g of allyl methacrylate (AMA) as an internal crosslinking agent, about 25 g of about 26 wt % sodium polyoxyethylene laurylether sulfate as a first surfactant, about 10 g of about 30 wt % sodium lauryl sulfate as a second surfactant, about 2 g of sodium carbonate as a buffering agent, about 2 g of sodium methylallyl sulfonate as a third surfactant, and about 220 g of water was added, and mixed with a stirrer to prepare a milky pre-emulsion.

To the 2L-volume glass reactor containing the surfactant, about 10 g of about 5 wt % ammonium persulfate was introduced and dissolved under stirring for about 10 minutes. Further, to the glass reactor, the pre-emulsion thus prepared and about 150 g of about 5 wt % aqueous solution of ammonium persulfate were continuously added in an equal ratio for about 4 hours. At about 3 hours after initiation of the polymerization, a 50% aqueous solution of diacetone acrylamide (DAAM) was prepared as a first external crosslinking agent introduced to the polymerization process, and about 14 g thereof (DAAM net weight: about 7 g) was introduced under stirring so that its content was about 0.7 parts by weight with respect to 100 parts by weight of the acrylic emulsion resin. Subsequently, about 5 g of about 5 wt % aqueous solution of ammonium persulfate was further introduced to the reactor where the polymerization proceeded, and maintained at about 80° C. This temperature was maintained for about 1 hour, and cooled to room temperature to prepare an acrylic emulsion resin for a pressure-sensitive adhesive.

About 10 wt % aqueous ammonia solution was added to the acrylic emulsion resin to adjust pH at about 7 to about 8.5.

Thereafter, about 10% aqueous solution of adipic acid dihydride (ADH) was prepared as a second external crosslinking agent introduced to the post-addition process, and to the reaction mixture of which pH was adjusted, about 35 g thereof (ADH net weight: about 3.5 g) was introduced so that its content was about 0.35 parts by weight with respect to 100 parts by weight of the acrylic emulsion resin. Additionally, dioctyl sodium sulfosuccinate as a wetting agent that serves as an emulsifying agent to decrease surface tension for coating property was added in an amount of about 1 part by weight with respect to 100 parts by weight of the acrylic emulsion resin, and stirred at a temperature of about 25° C. for about 60 minutes to prepare an acrylic emulsion pressure-sensitive adhesive composition.

Example 2

An acrylic emulsion pressure-sensitive adhesive composition was prepared in the same manner as in Example 1, except that about 500.0 g of butylacrylate (BA), about 312.0 g of 2-ethylhexylacrylate (2-EHA), and about 1 g of allyl methacrylate (AMA) as an internal crosslinking agent were used, as in the following Table 1.

Example 3

An acrylic emulsion pressure-sensitive adhesive composition was prepared in the same manner as in Example 1, except that about 312.0 g of butylacrylate (BA), about 500.0 g of 2-ethylhexylacrylate (2-EHA), and about 0.07 g of allyl methacrylate (AMA) as an internal crosslinking agent were used, as in the following Table 1.

Comparative Example 1

To a 2 L-volume glass reactor equipped with a thermostat, a stirrer, a dropping funnel, a nitrogen feeding tube, and a reflux condenser, about 290.2 g of water and about 1.9 g of 26 wt % sodium polyoxyethylene lauryl ether sulfate as a first surfactant were added. Air inside the reactor was replaced with nitrogen while stirring, and then the temperature was raised to about 80° C. under nitrogen atmosphere, and maintained about for 60 minutes.

Separately, about 314.4 g of butylacrylate, about 401.8 g of 2-ethylhexylacrylate, about 50.4 g of methylmethacrylate, about 202.6 g of vinyl acetic acid, about 20.3 g of styrene (SM), and about 10.5 g of acrylic acid (AA) were put in a beaker, and mixed for about 30 minutes to prepare 1000.0 g of a monomer mixture. To the monomer mixture, a solution composed of about 1.5 g of polyethylene glycol 400 diacrylate (M280) as an internal crosslinking agent, about 25 g of about 26 wt % sodium polyoxyethylene laurylether sulfate as a first surfactant, about 10 g of about 30 wt % sodium lauryl sulfate as a second surfactant, about 2 g of sodium carbonate as a buffering agent, about 2 g of sodium methylallyl sulfonate as a third surfactant, and about 230 g of water was added, and about 2 g of about 50% aqueous solution of methacrylamidoethyl ethylene urea (WAM) was added thereto, and mixed with a stirrer to prepare a milky pre-emulsion.

To 2 L-volume glass reactor including the surfactant, about 10 g of about 5 wt % ammonium persulfate was added and dissolved by stirring for about 10 minutes. To the glass reactor, the pre-emulsion prepared above and about 150 g of about 5 wt % aqueous solution of ammonium persulfate were continuously added in an equal ratio for about 4 hours. At about 3 hours after initiation of the polymerization, an about 50% aqueous solution of diacetone acrylamide (DAAM) was prepared as a first external crosslinking agent introduced to the polymerization process, and about 14 g thereof (DAAM net weight: about 7 g) was introduced under stirring so that its content was about 0.7 parts by weight with respect to 100 parts by weight of the acrylic emulsion resin. Subsequently, about 5 g of about 5 wt % aqueous solution of ammonium persulfate was further introduced to the reactor where the polymerization proceeded, and maintained at about 80° C. This temperature was maintained for about 1 hour, and cooled to room temperature to prepare an acrylic emulsion resin for a pressure-sensitive adhesive.

About 10 wt % aqueous ammonia solution was added to the acrylic emulsion resin to adjust pH at about 7 to about 8.5.

Thereafter, about 10% aqueous solution of adipic acid dihydride (ADH) was prepared as a second external crosslinking agent introduced to the post-addition process, and to the reaction mixture of which pH was adjusted, about 35 g thereof (ADH net weight: about 3.5 g) was introduced so that its content was about 0.35 parts by weight with respect to 100 parts by weight of the acrylic emulsion resin. Additionally, dioctyl sodium sulfosuccinate as a wetting agent that serves as an emulsifying agent to decrease surface tension for coating property was added in an amount of about 1 part by weight with respect to 100 parts by weight of the acrylic emulsion resin, and stirred at a temperature of about 25° C. for about 60 minutes to prepare an acrylic emulsion pressure-sensitive adhesive composition.

Comparative Example 2

An acrylic emulsion pressure-sensitive adhesive composition was prepared in the same manner as in Example 2, except that about 0.1 g of polyethylene glycol 400 diacrylate (M280) was used as an internal crosslinking agent, instead of allyl methacrylate (AMA), as in the following Table 1.

Comparative Example 3

An acrylic emulsion pressure-sensitive adhesive composition was prepared in the same manner as in Comparative Example 2, except that SLS was not used, as in the following Table 1.

Comparative Example 4

An acrylic emulsion pressure-sensitive adhesive composition was prepared in the same manner as in Example 1, except that about 0.1 g of allyl methacrylate (AMA) was used as an internal crosslinking agent, as in the following Table 1.

Comparative Example 5

An acrylic emulsion pressure-sensitive adhesive composition was prepared in the same manner as in Example 1, except that about 3.0 g of allyl methacrylate (AMA) was used as an internal crosslinking agent, as in the following Table 1.

Comparative Example 6

An acrylic emulsion pressure-sensitive adhesive composition was prepared in the same manner as in Example 1, except that about 0.03 g of diallyl maleate (DAM) was used as an internal crosslinking agent, instead of allyl methacrylate (AMA), as in the following Table 1.

Comparative Example 7

An acrylic emulsion pressure-sensitive adhesive composition was prepared in the same manner as in Example 1, except that about 0.03 g of tripropylene glycol diacrylate (TPGDA) was used as an internal crosslinking agent, instead of allyl methacrylate (AMA), as in the following Table 1.

Comparative Example 8

An acrylic emulsion pressure-sensitive adhesive composition was prepared in the same manner as in Example 1, except that about 0.03 g of ethylene glycol dimethacrylate (EGDMA) was used as an internal crosslinking agent, instead of allyl methacrylate (AMA), as in the following Table 1.

Specific components and contents used in the preparation of the acrylic emulsion resin in the acrylic emulsion pressure-sensitive adhesive compositions according to Examples and Comparative Examples are as described in Table 1 below.

TABLE 1

| | | Example | | | Comparative Example | | | | | | | |
|---|---|---|---|---|---|---|---|---|---|---|---|---|
| | | 1 | 2 | 3 | 1 | 2 | 3 | 4 | 5 | 6 | 7 | 8 |
| | BA | 31.49 | 50.30 | 31.49 | 31.44 | 50.30 | 50.30 | 31.49 | 31.49 | 31.49 | 31.49 | 31.49 |
| | 2-EHA | 50.30 | 31.49 | 50.30 | 40.18 | 31.49 | 31.49 | 50.30 | 50.30 | 50.30 | 50.30 | 50.30 |
| | VAc | — | — | — | 20.26 | — | — | — | — | — | — | — |
| | SM | 2.03 | 2.03 | 2.03 | 2.00 | 2.03 | 2.03 | 2.03 | 2.03 | 2.03 | 2.03 | 2.03 |
| | MMA | 15.13 | 15.13 | 15.13 | 5.04 | 15.13 | 15.13 | 15.13 | 15.13 | 15.13 | 15.13 | 15.13 |
| | AA | 1.05 | 1.05 | 1.05 | 1.05 | 1.05 | 1.05 | 1.05 | 1.05 | 1.05 | 1.05 | 1.05 |
| Internal crosslinking agent (parts by weight) | AMA | 0.03 | 0.10 | 0.07 | — | — | — | 0.01 | 0.3 | — | — | — |
| | M280 | — | — | — | 0.15 | 0.10 | 0.10 | — | — | — | — | — |
| | DAM | — | — | — | — | — | — | — | — | 0.03 | — | — |
| | TPGDA | — | — | — | — | — | — | — | — | — | 0.03 | — |
| | EGDMA | — | — | — | — | — | — | — | — | — | — | 0.03 |
| External crosslinking agent (parts by weight) | | 0.7 | 0.7 | 0.7 | 0.7 | 0.7 | 0.7 | 0.7 | 0.7 | 0.7 | 0.7 | 0.7 |
| Functional crosslinking agent (parts by weight) | | — | — | — | 0.1 | — | — | — | — | — | — | — |
| First surfactant (parts by weight) | | 0.7 | 0.7 | 0.7 | 0.7 | 0.7 | 0.7 | 0.7 | 0.7 | 0.7 | 0.7 | 0.7 |

TABLE 1-continued

|  | Example | | | Comparative Example | | | | | | | |
| --- | --- | --- | --- | --- | --- | --- | --- | --- | --- | --- | --- |
|  | 1 | 2 | 3 | 1 | 2 | 3 | 4 | 5 | 6 | 7 | 8 |
| Second surfactant (parts by weight) | 0.3 | 0.3 | 0.3 | 0.3 | 0.3 | — | 0.3 | 0.3 | 0.3 | 0.3 | 0.3 |
| Third surfactant (parts by weight) | 0.2 | 0.2 | 0.2 | 0.2 | 0.2 | 0.2 | 0.2 | 0.2 | 0.2 | 0.2 | 0.2 |
| Buffering agent (parts by weight) | 0.2 | 0.2 | 0.2 | 0.2 | 0.2 | 0.2 | 0.2 | 0.2 | 0.2 | 0.2 | 0.2 |

BA: butyl acrylate
2-EHA: 2-ethylhexyl acrylate
VAc: vinyl acetate
SM: styrene
MMA: methyl methacrylate
AA: acrylic acid
AMA: allyl methacrylate
M280: polyethylene glycol 400 diacrylate (PEGDA)
DAM: diallyl maleate
TPGDA: tripropylene glycol diacrylate
EGDMA: ethylene glycol dimethacrylate
External crosslinking agent: diacetone acrylamide
Functional crosslinking agent: methacrylamidoethyl ethylene urea
First surfactant: sodium polyoxyethylene lauryl ether sulfate
Second surfactant: sodium lauryl sulfate
Third surfactant: sodium methylallyl sulfonate
Buffering agent: sodium carbonate In the composition of Table 1, each (meth)acrylic acid ester monomer which is a main component constituting the acrylic emulsion resin, and each comonomer including a hydroxy group, an epoxy group, a cyano group, a styrene group, a carboxyl group, etc. were added such that the sum of the contents (% by weight) thereof became 100% by weight, and the inputs of other components were expressed as a ratio (parts by weight) with respect to total 100 parts by weight of the monomer mixture.

Experimental Example

Preparation of Pressure-Sensitive Adhesive-Coated Adhesive Specimen

Each of the acrylic emulsion pressure-sensitive adhesives prepared in Examples and Comparative Examples was coated onto silicone-coated release paper, and dried in an oven at about 120° C. for about 1 minute to form an adhesive layer having a thickness of about 20 μm. The resultant release paper was laminated with a polyethylene terephthalate film to form a label for clothing, which was cut to a size of 1 inch×150 mm, thereby completing fabrication of a label specimen for clothing.

Adhesive properties of the acrylic emulsion pressure-sensitive adhesives prepared in Examples and Comparative Examples were evaluated by the following methods. The results are shown in Table 2 below.

Peel Strength (Peel) Test (N/inch)

In accordance with FINAT TEST METHOD NO. 2, the paper label specimen of the acrylic emulsion pressure-sensitive adhesive was attached to a high density polyethylene (HDPE) film by reciprocating about 2 kg roller twice at a speed of about 300 mm/min, and aged at room temperature for about 20 minutes, and then peeled off at an angle of 90° and a speed of about 300 mm/min using TA Texture Analyzer. The target value may be about 2.4 N/inch or more, preferably about 3.0 N/inch or more.

Initial Adhesive Strength (Loop Tack) Test (N/inch)
Preparation of specimen for loop
Specimen size: 25 mm×150 mm
Attachment substrate: Glass or HDPE
Measurement conditions: 22±2° C., 5±5% RH
Measurement method: the specimen was looped and fixed in clamps, and the specimen was attached to a glass or high density polyethylene (HDPE) film at a constant speed. About 5 seconds later, the maximum force which is needed to detach in the opposite direction by applying a measurement speed of about 300 mm/min was determined as loop tack strength. The target value was about 6.0 N/inch or more, preferably about 9.0 N/inch or more with respect to the glass plate, and about 2.5 N/inch or more, preferably about 3.0 N/inch or more with respect to the HDPE film.

Holding Power (Shear)

A holding power test (shear test) was performed by the following method.

Specimen size: 25 mm×25 mm
Attachment substrate: Bright stainless steel plate was prepared (Bright SUS: polished and more slippery)
Measurement conditions: 22±2° C., 5±5% RH
Measurement method: the specimen was attached to the attachment surface by reciprocating about 2 kg roller once, and the holding power was measured without dwell time (measurement speed: 300 mm/min).

A fixed load of about 1 kg was applied to the bottom of the specimen, and the time when the pressure-sensitive adhesive specimen was dropped was measured. The target value was about 4500 minutes or more.

Residual Ratio

Specimen size: 25 mm×150 mm
Attachment substrate: fabric for clothing
Measurement conditions: 22±2° C., 60±5% RH
Measurement method: A label sample was pressed on a selected fabric for clothing five times using a roller of about 5 kg load, and the attached sample was pressed with a load of about 3.5 kg in a thermohygrostat at a temperature of about 60° C. and a relative humidity of 95%, and then aged for 7 days. Here, as the fabric for clothing, a 100% polyester fabric or a 100% cotton fabric, or a blended fabric of 52% polyester and 48% cotton was used. The sample thus aged for 7 days was taken, and left in a thermohygrostat (about 24° C. and about 60%) for 24 hours while applying the load of about 3.5 kg. Thereafter, the sample was taken, and the label sample was removed by hand to measure the amount of pressure-sensitive adhesive remaining on the fabric substrate for clothing, which was determined as the residual ratio (%) (The same analysis method as in KOTITI which is an institute for testing textile products was applied to the clothing size sticker test). In the institute for testing textile products, the residual ratio was determined by observing the presence or absence of adhesive strength, clothing damage, and clothing color change when the pressure-sensitive adhesive was examined with the naked eye or touched by hand.

TABLE 2

|  | Loop tack (N/inch) | | 90° peel (N/inch) | Shear (min) | Residual ratio (clothing) |
| --- | --- | --- | --- | --- | --- |
|  | Glass | HDPE | HDPE | 0.5 * 0.5 inch | (%) |
| Example 1 | 10.5 | 4.6 | 4.5 | 5000 | 1-3 |
| Example 2 | 6.5 | 2.6 | 2.4 | >6000 | 1-3 |
| Example 3 | 7.9 | 2.7 | 2.5 | >6000 | 1-3 |
| Comparative Example 1 | 14.3 | 5.8 | 5.8 | 360 | 80 |
| Comparative Example 2 | 9.6 | 2.8 | 2.6 | >5260 | 20 |
| Comparative Example 3 | 11.2 | 3.1 | 2.6 | 4200 | 10 |
| Comparative Example 4 | 12.6 | 5.5 | 5.4 | 3400 | 90 |
| Comparative Example 5 | 3.8 | 1.4 | 1.4 | >6000 | 0 |
| Comparative Example 6 | 9.2 | 2.8 | 2.6 | >6000 | 20 |
| Comparative Example 7 | 8.0 | 3.1 | 2.9 | >6000 | 30 |
| Comparative Example 8 | 9.5 | 3.8 | 3.6 | 6000 | 20 |

From the results of Table 2, it was confirmed that Examples 1 to 3 showed excellent adhesive strength while maintaining the very low residual ratio of about 1% to about 3% by controlling the internal crosslinking density. In particular, Example 1 showed excellent property of initial adhesive strength while showing the remarkably decreased internal crosslinking density, and Examples 2 to 3 showed excellent residual ratio and very excellent pressure-sensitive adhesive holding power of about 6000 minutes or more with respect to the fabric for clothing, although showing the increased internal crosslinking density.

In contrast, Comparative Examples 1 to 8, in which the internal crosslinking agents were used according to the existing method, showed generation of a lot of residues or showed reduced adhesive strength, and thus they were not attached to the clothing.

First, Comparative Examples 1 to 3 showed problems of increased initial adhesive strength and increased residual ratio by using polyethylene glycol 400 diacrylate, instead of allyl methacrylate, as the internal crosslinking agent. In particular, Comparative Example 1 showed the high residual ratio of about 80% due to too high initial adhesive strength and very poor pressure-sensitive adhesive holding power of about 360 minutes with respect to the fabric for clothing by using about 1.5 g of polyethylene glycol 400 diacrylate. Further, Comparative Examples 2 and 3 showed excellent initial adhesive strength, but showed low peel property and the residual ratio of about 10% to 20%, because the crosslinking efficiency was decreased by using polyethylene glycol 400 diacrylate, instead of allyl methacrylate of Example 2. Thus, Comparative Examples 2 and 3 generated problems that the overall physical properties were unstable, leading to decreased reliability for various adhesive strengths depending on the type of fabric. Moreover, Comparative Example 3 showed problems of decreased pressure-sensitive adhesive holding power with respect to the fabric for clothing and the residual ratio of about 10% by excluding sodium lauryl sulfate as a surfactant which was used to reduce air bubbles in latex.

Meanwhile, Comparative Example 4 showed high initial adhesive strength, but showed a problem of leaving a lot of residues of about 90%, because allyl methacrylate as the internal crosslinking agent was used in the excessively small amount of about 0.10 g. In contrast, Comparative Example 5 showed remarkably low initial adhesive strength of about 3.8 N/inch (Glass) and about 1.4 N/inch (HDPE) and thus did not stick to the clothing, because allyl methacrylate as the internal crosslinking agent was used in the excessively large amount of about 3 g.

Further, Comparative Examples 6 to 8 showed the residual ratio of about 20% to about 30%, because diallyl maleate, tripropylene glycol diacrylate, or ethylene glycol dimethacrylate was used as internal crosslinking agent, respectively, instead of allyl methacrylate in the composition of Example 1, and thus there is a problem in that they may not be used for clothing. In particular, Comparative Example 6 showed remarkably low adhesive strength, as compared with Example 1, because of the long chain length and the restricted reaction point of diallyl maleate as the crosslinking agent. Further, Comparative Example 7 showed a problem that desired adhesive strength was not obtained, because less crosslinking occurred by using tripropylene glycol diacrylate of the long chain length in an amount equal to allyl methacrylate. Lastly, Comparative Example 8, in which ethylene glycol dimethacrylate was used, showed the similar chain length but different reactivity, and thus generated a problem of leaving residues of about 20%. As described, when the residual ratio is about 20% or more, the pressure-sensitive adhesive more sticks to the fabric than the label at the time of removing the label sample from a fabric for clothing after attaching the label sample to the fabric for clothing, and thus marks are clearly left and easily visible to the naked eye.

The invention claimed is:

1. A water-based acrylic pressure-sensitive adhesive for clothing, comprising an acrylic emulsion resin which is prepared by emulsion polymerization of a monomer mixture in the presence of an internal crosslinking agent,
wherein the monomer mixture includes a (meth)acrylic acid ester monomer and comonomers,
wherein the (meth)acrylic acid ester monomer comprises -methyl methacrylate, 2-ethylhexylacrylate, and butyl acrylate, and the comonomers comprises styrene, and acrylic acid,
wherein the internal crosslinking agent is one or more selected from the group consisting of allyl methacrylate, polycarbodiimide, allyl-N-methyl carbamate, 1,6-hexanediol diacrylate, hexanediol ethoxylate diacrylate, hexanediol propoxylate diacrylate, pentaerythritol ethoxylate triacrylate, pentaerythritol propoxylate triacrylate, vinyltrimethoxysilane, and divinylbenzene,
the internal crosslinking agent is included in an amount of 0.02 parts by weight to 0.25 parts by weight with respect to 100 parts by weight of the acrylic emulsion resin, and
wherein the comonomers are included in an amount of 10 parts by weight or less with respect to 100 parts by weight of the (meth)acrylic acid ester monomer.

2. The water-based acrylic pressure-sensitive adhesive according to claim 1, wherein the monomer mixture includes the methyl methacrylate of 5% by weight to 25% by weight, the 2-ethylhexylacrylate of 30% by weight to 60% by weight, the styrene of 0.5% by weight to 10% by weight, the butyl acrylate of 20% by weight to 40% by weight, and the acrylic acid of 0.5% by weight to 10% by weight, based on the total weight of the monomer mixture.

3. The water-based acrylic pressure-sensitive adhesive according to claim 1, wherein a residual ratio on a fabric for clothing is 8% or less, and
wherein the fabric is a cotton fabric, a polyester fabric, or a cotton and polyester blend fabric.

4. The water-based acrylic pressure-sensitive adhesive according to claim 1, wherein the comonomers are included in an amount of 1 part by weight to 6 parts by weight with respect to 100 parts by weight of the (meth)acrylic acid ester monomer.

* * * * *